Oct. 19, 1965   C. M. FREY ETAL   3,212,257
ROCKET MOTOR
Original Filed March 25, 1959
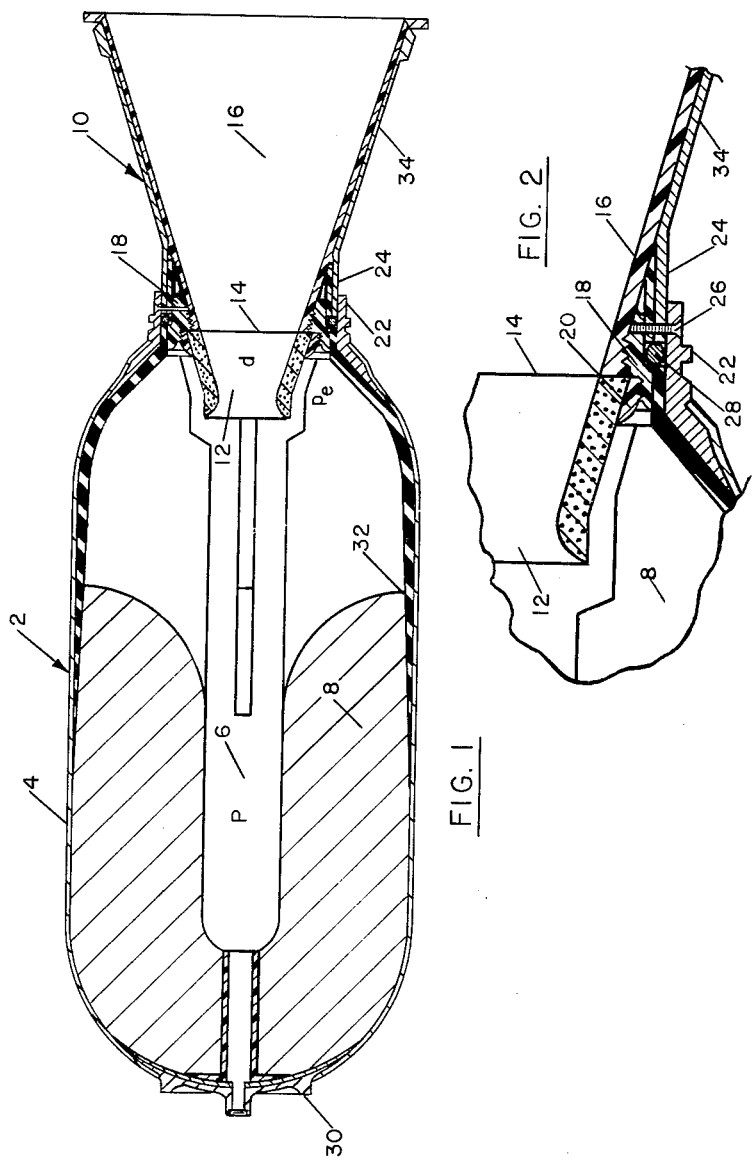
CHRISTIAN M. FREY
EARL D. SHANK
INVENTORS
BY Ernest G. Peterson
AGENT United States Patent Office 3,212,257
Patented Oct. 19, 1965

3,212,257
ROCKET MOTOR
Christian M. Frey, Los Altos, Calif., and Earl D. Shank, Cumberland, Md., assignors to Hercules Powder Company, Wilmington, Del., a corporation of Delaware
Continuation of application Ser. No. 801,962, Mar. 25, 1959. This application Oct. 23, 1964, Ser. No. 406,198
6 Claims. (Cl. 60—35.6)

This application is a continuation of our copending application Serial No. 801,962, filed March 25, 1959, now abandoned.

This invention relates to rocket motors and more particularly to the combustion chamber and exhaust nozzle therefor.

One of the objects of this invention is to increase the amount of propellant in a rocket motor without increasing the motor's diameter or overall length.

Another object is to provide for a reduction in weight of the overall nozzle assembly since the amount of insulation heretofore found necessary for insulating the nozzle from the shell or casing of the combustion chamber is considerably reduced.

Still another object is to provide for the utilization of nozzle materials which heretofore have not been found entirely satisfactory due to poor tensile strength but, on the other hand, have relatively good compressive strength.

Still another object is to provide for the utilization of nozzle materials which heretofore have not been found satisfactory due to susceptibility to thermal shock.

Other objects of this invention will be apparent from the detailed description given hereinafter and the appended claims.

Generaly described the present invention comprises a rocket motor having in combination a combustion chamber and a Venturi-type exhaust nozzle having its throat section extending into the said combustion chamber and unsupported throughout a substantial portion of its length.

A preferred embodiment of the invention has been chosen for purposes of illustration and description and is shown in the accompanying drawing wherein reference symbols refer to like parts wherever they occur. FIG. 1 is a longitudinal sectional view of a rocket motor constructed in accordance with the invention, and FIG. 2 is an enlarged, fragmentary sectional view of the throat section of the rocket motor of FIG. 1.

In the drawing, the rocket motor represented by 2 has a shell or casing 4 and a combustion chamber 6 for containing a suitable solid propellant charge 8. The propellant charge illustrated is a single-perforated four-slotted grain. Affixed to the egress end of the casing 4 is a nozzle assembly represented by 10. The nozzle assembly is composed of a throat section 12 provided with a thrust shoulder 14 which engages an exit cone section 16 with smooth transition between the inside of the throat section and the inside of the cone section. A support ring 18 is threadedly secured to the cone section 16 and engages that portion of the thrust shoulder 14 which extends beyond its engagement with the cone section 16. A retainer ring 20 extending into the combustion chamber 6 firmly engages the outside of the throat section 12 at its egress end and is threadedly secured to the support ring 18 whereby the combination of the two rings serves to maintain the throat section 12 and the cone section 16 in true axial alignment with each other and the longitudinal axis of the motor.

As previously mentioned, the nozzle assembly represented by 10 is affixed to the egress end of the casing 4. To accomplish this, and to maintain axial alignment between the casing and nozzle assembly, the casing 4 is provided with a peripheral extension 22 and the cone section 16 is provided with a peripheral extension 24 wherein the respective extensions engage and overlap each other with a slip fit as illustrated more particularly in FIG. 2. A plurality of screws represented by 26 extends through the extensions 22 and 24, respectively, and the support ring 18 to thereby rigidly affix and secure the nozzle assembly to the casing. An "O" ring 28 is provided at the end of extension 24 to insure a gas-tight seal between the combustion chamber and the aforesaid connecting elements for the nozzle assembly.

To demonstrate operation of the invention, a series of firings was made using a rocket motor of approximately 18 inches in diameter and approximately 58 inches in total length. The fuel was a solid propellant charge and the throat section was made of highly refractory material. Highly refractory materials, in general, have poor tensile strength but, on the other hand, have good compressive strength. Accordingly, graphite was chosen as the material for the throat section of the nozzle since it has good resistance to thermal shock and has good resistance to high velocity combustion gases. However, as is well known, graphite has poor tensile strength, but good compressive strength. The series of firings referred to above was entirely satisfactory using the principle of this invention in conjunction with a single-perforated four-slotted, aluminized double-base solid propellant grain which measured 17.8 inches in diameter and 40 inches in length and had a flame temperature of 2859° K., a ratio of heat capacities of 1.23, and at sea level, a theoretical specific impulse of 235 lb. f.-sec./lb. w. at a chamber pressure of 1000 p.s.i. With reference to FIG. 1, it will be appreciated that the gas pressure (P) within the combustion chamber and the gas pressure ($p_e$) exteriorly of the throat section 12 are substantially the same. On the other hand, the high velocity flow of the gas through the Venturi throat ($d$) greatly reduces the pressure within the throat section. Thus, a pressure differential is created as between $p_e$ and $d$ which places that portion of the throat section 12 which extends into the combustion chamber 6 under compressive stress, under which condition the more favorable structural attribute of the graphite is utilized. Moreover, it will be appreciated that although graphite possesses good resistance to thermal shock, another feature of the invention resides in simultaneously heating the throat section interiorly and exteriorly to more uniformly bring it up to operating temperature and thereby permit the utilization of highly refractory materials which heretofore have been found deficient in respect to thermal shock in the absence of uniform heating. Still another feature of the invention resides in that solid propellant can be disposed about the throat section to promote more uniform heating and to provide an increase in the amount of propellant without increasing the motor's diameter or overall length. Still another feature of the invention resides in the resultant thrust which is imparted to the thrust shoulder 14 as provided by the pressure (P) acting upon the exterior, exposed surface of the throat section 12 to thereby provide an improved gas seal between the throat section of the nozzle and its adjacent supporting elements.

From the foregoing it will be seen that the various objects set forth in respect to this invention may be accomplished with utilization of a wide variation in materials of construction. For example, the chamber design will be dependent upon the type of propellant used, the internal pressures generated, the temperature, insulation requirements, corrosiveness, etc., which will dictate the type of materials to be used. Ordinarily, aluminum alloy, heat-treated titanium alloy, mild carbon steel, heat-treated low alloy steel, heat-treated stainless steel and glass wound filament structures are used for the exterior casing. The latter material represents a preferred material in view of its high ratio of strength to density and the ease with which inserts and attachments of metal and other materials may be interwound and rigidly secured in the filament structure. In this respect a fiberglass-epoxy filament winding was used as the major exterior casing material for the rocket motors used to demonstrate the operation of this invention. An aluminum forward adaptor 30 and an aluminum aft adaptor represented by extension 22 were interwound into the fiberglass-epoxy filament structure. Also, and in addition, the interior of the casing, throughout a portion of its area, was provided with insulation 32 which was silica loaded rubber and the nozzle exit section 16 was composed of an outer shell of fiberglass-epoxy filament 34 with the interior thereof provided with insulation 16 which was molded phenolic asbestos material.

Similarly, the nozzle design will be dependent to a considerable extent upon the factors set forth for chamber design. However, as the search for more powerful fuels progresses, the requirements of nozzle design become more severe. Heating conditions to which the nozzle exit section is subjected are considerably less severe than those in the throat section. Consequently, depending on required performance, many of the materials used for casing construction and insulation may be used for the nozzle exit section. Carbon (e.g., graphite) represents a preferred material for the nozzle throat section for reasons heretofore set forth. Other materials suitable for this purpose whether used alone or as interior inserts include high temperature resistant metals, such as molybdenum, tungsten, tantalum and alloys thereof; filled thermosetting resins, such as phenolic-asbestos, phenolic-leached glass, and epoxy-fiberglass; ceramics, such as aluminum oxide, zirconium oxide, and boron nitride; nonmetallic and metallic carbides, such as silicon carbide, tungsten carbide, and titanium carbide; and cermets, such as titanium carbide with nickel or cobalt binder, or with nickel alloys with chromium, molybdenum, or aluminum; boride base materials with or without the addition of materials such as chromium or nickel, using zirconium boride, chromium boride, and molybdenum boride as the refractory components; silicide materials on the basis of chromium or molybdenum disilicide; and aluminum oxide with chromium materials. Generally, it may be stated that the various materials of construction for casings, nozzle throat sections and nozzle exit sections are to a considerable extent interchangeable and even more so when employed as inserts and composites to realize the best balance of properties. This particularly applies to general performance motors. However, for high-performance motors at which the present invention is particularly directed, the requirements in respect to materials of construction become quite severe and it is in this category that this invention exhibits its greatest advantages.

Although the preferred embodiment of this invention has been demonstrated for an axial alignment motor, it will be appreciated that the principle of the invention may be employed in conjunction with swivelled nozzles, jet vanes and jetvators for controlling thrust and may be employed with angled nozzles for imparting spin, where in each instance the shortened length of the nozzle assembly may be employed to advantage along with the other features heretofore set forth.

It will be seen, therefore, that this invention may be carried out with the objects heretofore set forth accomplished by the use of various modifications and changes without departing from its spirit, with only such limitations placed thereon as imposed by the scope of the appended claims.

What we claim and desire to protect by Letters Patent is:

1. A rocket motor comprising in combination:
    (a) a combustion chamber having single-perforated internal burning solid propellant disposed therein throughout its entire length,
    (b) a Venturi-type exhaust nozzle affixed to the combustion chamber at its aft end,
    (c) said exhaust nozzle having a highly refractory throat section, including the Venturi portion thereof, extending substantially its entire length into the combustion chamber with the mass of propellant being disposed forward of the throat section and the aft portion thereof being substantially uniformly spaced about the throat section, whereby upon internal combustion of the propellant, the throat section is simultaneously heated interiorly and exteriorly substantially throughout its length by the hot propellant gas generated forward of the throat section and about the throat section, and
    (d) said exhaust nozzle having a heat resistant exit cone section, including a thrust shoulder, extending substantially its entire length from the combustion chamber with the thrust shoulder being the sole support and gas seal for the throat section at its widest portion, whereby during the aforesaid combustion of the propellant the gas pressure so generated acts upon the exterior exposed surface of the throat section imparting compressive thrust thereof upon the thrust should and gas seal to insure a tight gas seal throughout the entire combustion period.

2. The rocket motor of claim 1 in which the throat section comprises carbon.

3. The rocket motor of claim 1 in which the throat section comprises a high temperature resistant metal.

4. The rocket motor of claim 1 in which the throat section comprises a filled thermosetting resin.

5. The rocket motor of claim 1 in which the throat section comprises a ceramic material.

6. The rocket motor of claim 1 in which the throat section comprises a cermet material.

No references cited.

JULIUS E. WEST, *Primary Examiner.*